July 27, 1926.
F. E. GARBUTT ET AL
1,594,009
ADJUSTABLE CENTER PROJECTION PHOTOGRAPHIC PRINTER
Filed March 10, 1923
2 Sheets-Sheet 1

INVENTORS:
FRANK E. GARBUTT,
RALPH G. FEAR,
BY
*Graham + Lewis*
ATTORNEYS.

July 27, 1926. 1,594,009
F. E. GARBUTT ET AL
ADJUSTABLE CENTER PROJECTION PHOTOGRAPHIC PRINTER
Filed March 10, 1923 2 Sheets-Sheet 2

INVENTORS:
FRANK E. GARBUTT,
RALPH G. FEAR,
BY
Graham + Hauer
ATTORNEYS.

Patented July 27, 1926.

1,594,009

UNITED STATES PATENT OFFICE.

FRANK E. GARBUTT AND RALPH G. FEAR, OF LOS ANGELES, CALIFORNIA, ASSIGNORS TO FAMOUS PLAYERS-LASKY CORPORATION, A CORPORATION OF NEW YORK.

ADJUSTABLE CENTER PROJECTION PHOTOGRAPHIC PRINTER.

Application filed March 10, 1923. Serial No. 624,284.

This invention relates to the photographic art and relates particularly to the printing of positive images from negatives.

Although the invention has its particular utility in the manufacture of motion picture film and is described in such utility, it may be employed in the printing of positives from single negative films or plates.

In the motion picture industry a scene is photographed upon a negative film strip from which the positive film strips used for projection purposes are printed. It is customary in the taking of different scenes to emphasize particular points of interest in a drama by taking closeups of the particular actions constituting these special points of interest; but it often occurs that, after the entire production has been photographed, it is desirable to have, in the final arrangement of the film, closeups of other features than those which have been taken. In such instances it has been necessary to reenact the scene of which the additional closeup is required in order to photograph same at a close distance. This making of closeups after the picture has been practically completed is sometimes expensive as it often necessitates the bringing back of persons in the production who have been dismissed or placed upon other production work.

It is one of the particular objects of the invention to provide a projection printing device by which a certain portion of a previously taken negative may be enlarged and centered upon a positive film, thus providing a closeup of that particular portion of the previously taken negative.

It is also highly desirable to eliminate the taking of double exposures in the studio. It is one of the objects of this invention to provide means whereby the double exposure is made in the machine by means of reducing, enlarging or movement of the film laterally or vertically to take care of the double exposure. This is done by inserting suitable mats in the aperture so that only a portion of the sensitized film is exposed at one time.

The especial advantages of the invention and further objects thereof will be made evident hereinafter.

Referring to the drawings, which are for illustrative purposes only,

Fig. 4 represents a portion of a negative motion picture film having a small area in one corner thereof of which an enlargement is desired.

Fig. 5 represents a fragment of a positive film upon which it is desired to print a closeup of the small area shown in Fig. 4. This small area and the outline of the enlargement of the frame shown in Fig. 4 are represented in dotted lines in the position in which they would ordinarily occur previous to the centralizing upon the positive frame of the enlargement of the small area of which the closeup is desired.

Figure 1:
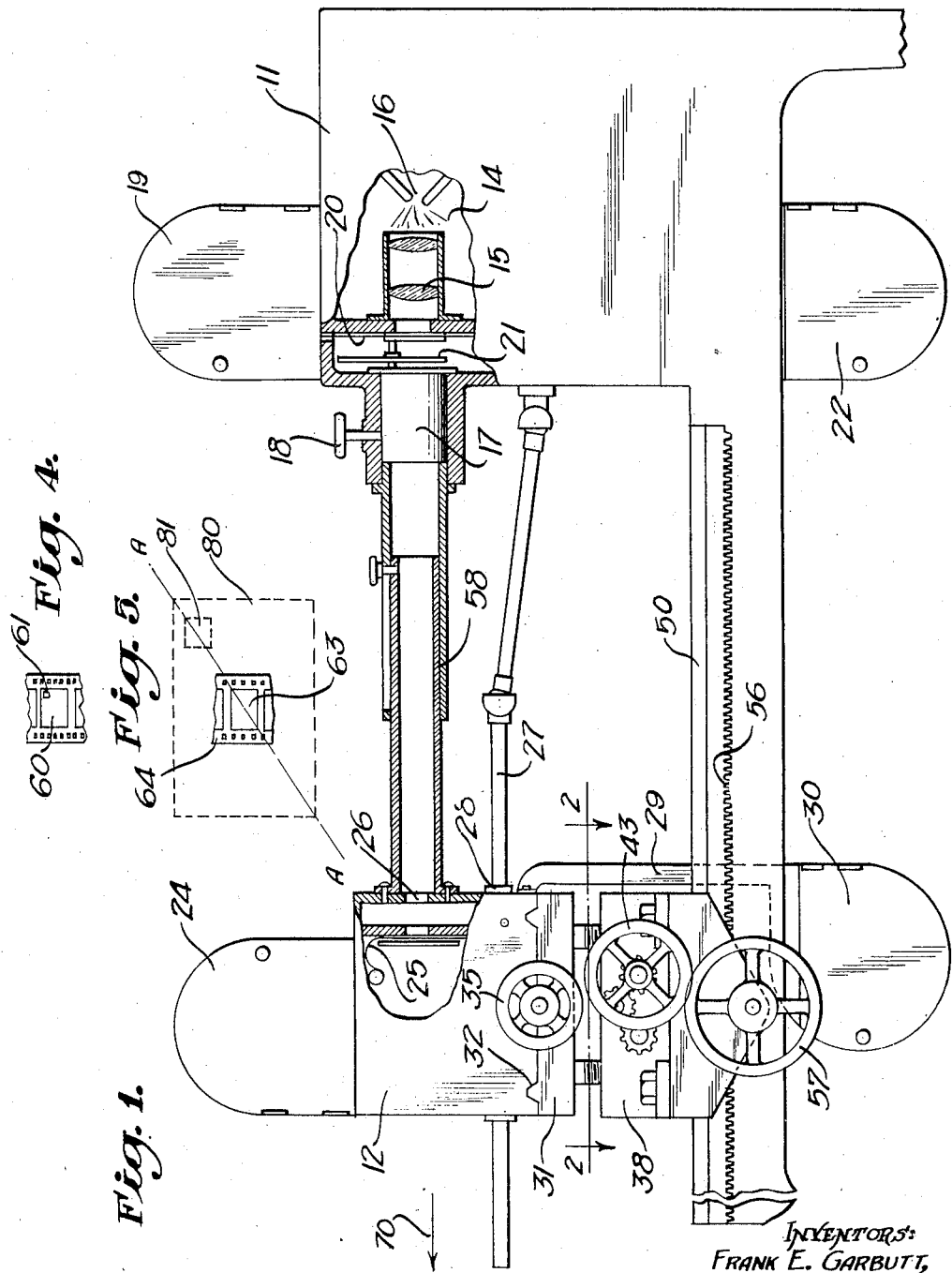
Fig. 1 is a diagrammatic view of a projection printer adapted to the practice of the principles of the invention.
Figure 2:
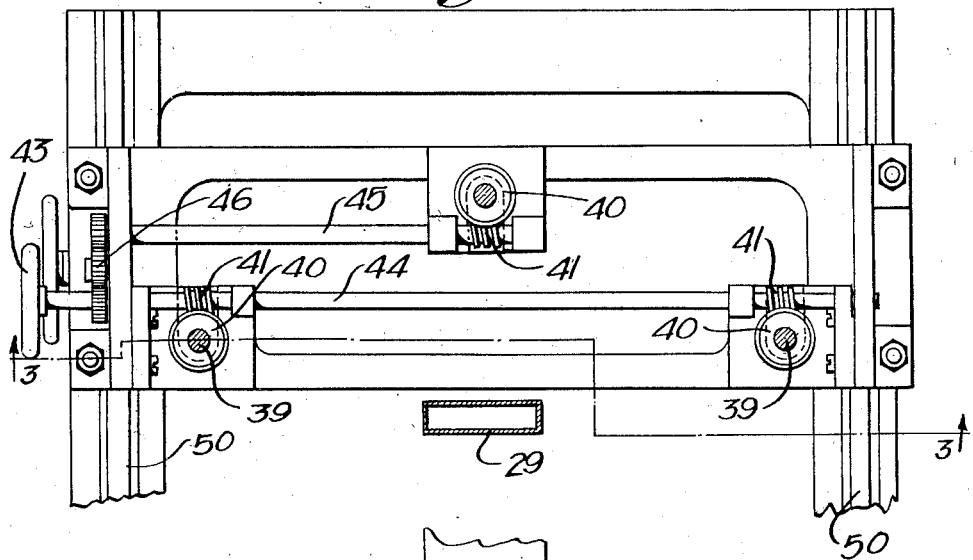
Fig. 2 is a plan view taken substantially upon a plane represented by line 2—2 of Fig. 1.
Figure 3:
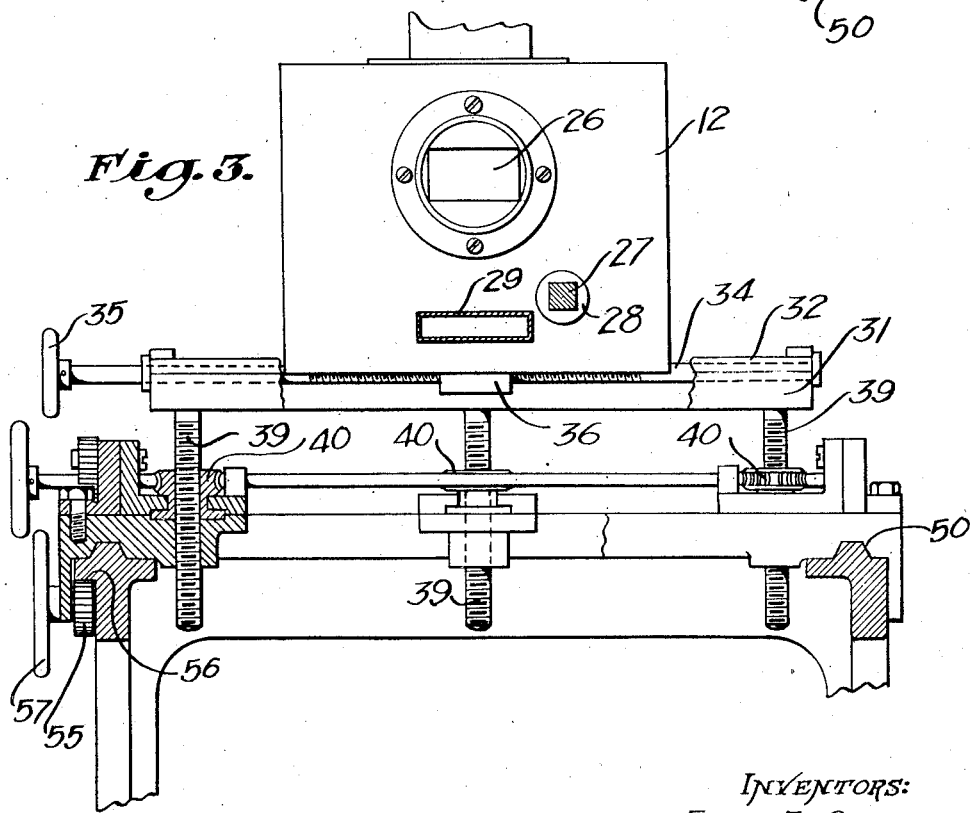
Fig. 3 is a fragmentary vertical section taken as indicated by the line 3—3 in Fig. 2.

As shown diagrammatically in Fig. 1, the projection printer employed in the practice of the invention provides a negative head 11, so called because the negative film from which the positive is to be printed travels therethrough, and a positive head 12 in which the positive film strip is carried. The negative head 11 contains a light chamber 14 and condensing lens 15 which conducts the light rays from an arc light 16 through a projection lens arrangement 17 which is focused by means of a knob 18. The negative film 20 is carried, from a film container 19, between the light box and the projection lens arrangement 17 and is intermittently advanced synchronously with the action of a shutter 21, by mechanism not shown, and is wound thereafter in a container 22.

The head 12 has a film container 24 mounted thereupon from which the positive film 25 is carried past a light aperture 26 by suitable mechanism which is synchronously operated by an advancing mechanism in the head 11 by means of a flexible square shaft 27 which extends through a sleeve 28 and is axially slidable therewithin. The positive film 25 after being exposed before the light aperture 26, is conducted through a conduit 29 to a film container 30.

The positive head 12 is mounted upon a table 31 which is provided with horizontal slides 32; and a horizontal screw 34, having a hand wheel 35 and threading through a nut 36, is provided for the purpose of moving the head 12 laterally upon the horizontal slides 32. The table 31 is supported upon a carriage 38 by lifting screws 39 which are threaded through worm gears 40 which are engaged by worm screws 41. By turning a hand wheel 43 situated at the side of the carriage 38 it is possible through shafts 44 and 45 and interconnecting gears 46 to rotate the worm screws 41 thereupon, causing rotation of the worm wheels 40 and the raising or the lowering of the screws which are threaded through the worm wheels and subsequently changing the vertical position of the table 31 upon which positive head 12 is mounted. The carriage 38 rests upon shears 50 and the position thereof relative to the negative head 11 may be adjusted by movement along the shears which is accomplished by a small gear 55 which engages a rack 56 formed upon one of the shears 50, this gear 55 being rotated by means of hand wheel 57. Throughout ordinary printing operations a telescoping tube 58 is employed between the projection lens arrangement 17 and the light aperture 26, and the lens arrangement 17 and the aperture 26 are positioned directly opposite one another. When this condition of alignment is present, the positive head 12 and the structure upon which it is supported is substantially in the position shown in the drawing.

In Fig. 4, 60 represents a frame of a negative film having a small area 61 in one corner thereof, containing an image which it is desired to enlarge and print upon the frame 63 of a positive film strip 64 in order that a closeup of the material contained in the small area 61 may be produced.

In the printing of an enlargement with the device shown, the head 12 is moved outwardly in the direction indicated by the arrow 70 by moving the carriage upon which it is supported outwardly along the shears by turning the hand wheel 57. The image cast from the negative film is then focused upon the positive film contained in the positive head 12 by adjusting the projection lens arrangement 17 through manipulation of the knob 18. In this manner any desired enlargement of the frame 60 may be accomplished, but such enlargements of the entire frame 60 would, as indicated by the dotted lines 80 in Fig. 5, be centralized with respect to the aperture 26 and the positive frame 63, with the result that the small area 81 would not strike the positive film 64. It then becomes necessary in order to centralize the enlargement 81 of the area 61 upon the frame 63 to remove the telescoping tube 58 and either to move the enlarged image 80 in the direction indicated by the axis a—a until it coincides with the frame 63, or to move the frame 63 along the axis a—a until it is in a position to receive the enlarged image 81. In the device shown, the centralizing is accomplished by the movement of the positive frame 63 in front of that portion of the enlargement which it is desired to print thereupon, or in other words, by moving the positive head 12 until the aperture 26 thereof is in a position to allow the image 81 to pass therethrough upon the positive film. This, as will be plainly perceived, may be accomplished by lifting the table 31, which is done by manipulating the hand wheel 43, and offsetting the head 12 upon the slides 32, by operating the hand wheel 35. The combined movement accomplished by the manipulation of the hand wheels 35 and 43 makes it possible to bring the aperture 26 into a position to receive any portion of the enlarged area 80.

We claim as our invention:

1. In a projection printer, the combination of: a negative head; a positive head; a table supporting said positive head, upon which said positive head is horizontally movable; a carriage supporting said table; shears extending from said negative head, upon which said carriage is movable; means for moving said carriage upon said shears; and means between said carriage and said positive head for elevating said positive head.

2. A device, as in claim 1, in combination with a screw for moving said positive head upon said table.

3. In a projection printer, the combination of: a negative head; a positive head; a table supporting said positive head, upon which said positive head is horizontally movable; a carriage supporting said table; shears extending from said negative head, upon which said carriage is movable; means for moving said carriage upon said shears; and means between said carriage and said positive head for elevating said positive head, said last named means including vertically disposed screws.

4. In a projection printer, the combination of: a negative head; a positive head; a table supporting said positive head, upon which said positive head is horizontally movable; a carriage supporting said table; shears extending from said negative head, upon which said carriage is movable; means for moving said carriage upon said shears; and means between said carriage and said positive head for elevating said positive head, said last named means including vertically disposed screws threaded through rotatable members, and means for rotating said members.

5. A device, as in claim 1, in combination with a flexible drive shaft between said heads.

In testimony whereof, we have hereunto set our hands at Los Angeles, California, this 3rd day of March, 1923.

FRANK E. GARBUTT.
RALPH G. FEAR.